Sept. 4, 1956
M. L. ABEL
2,761,747
LUBRICATED BEARING FOR SUPPORTING A PULLEY AND BLOWER VANES
Filed May 5, 1954
2 Sheets-Sheet 1
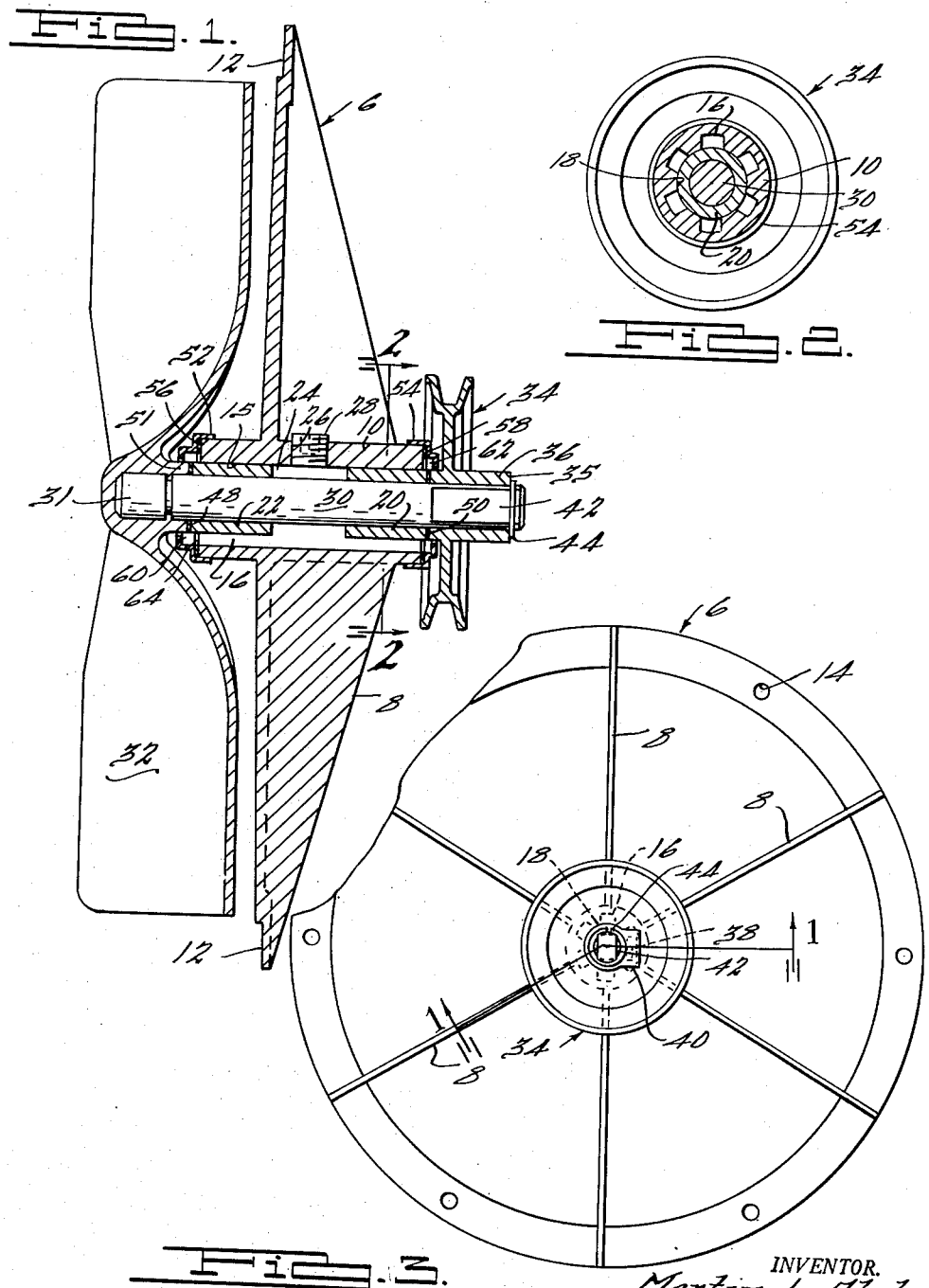

Sept. 4, 1956 M. L. ABEL 2,761,747
LUBRICATED BEARING FOR SUPPORTING A PULLEY AND BLOWER VANES
Filed May 5, 1954 2 Sheets-Sheet 2
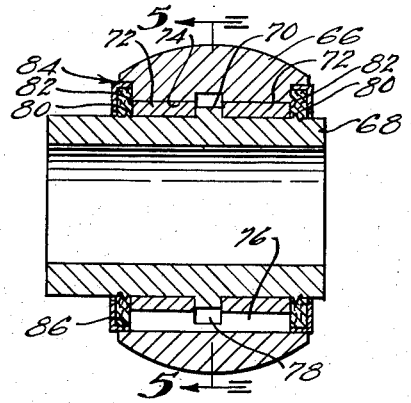
Fig. 4.
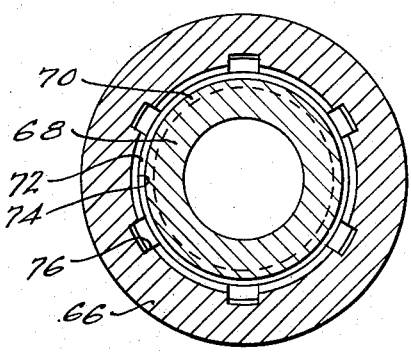
Fig. 5.
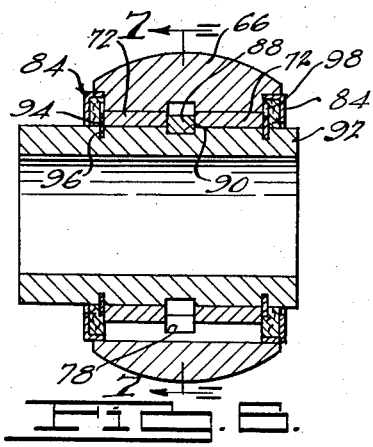
Fig. 6.
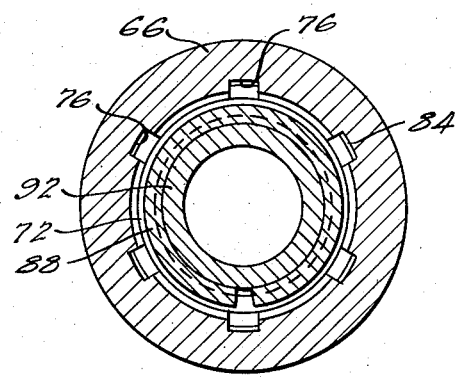
Fig. 7.
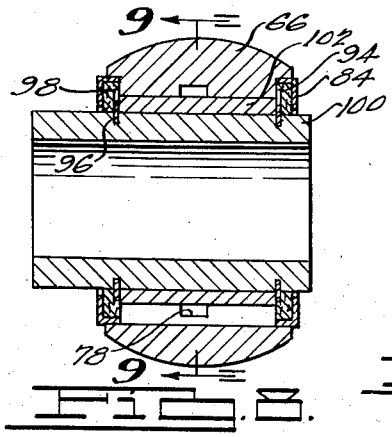
Fig. 8.
Fig. 9.
INVENTOR.
Martin L. Abel.
BY
Harness, Dickey & Pierce
ATTORNEYS.

United States Patent Office

2,761,747
Patented Sept. 4, 1956

2,761,747

LUBRICATED BEARING FOR SUPPORTING A PULLEY AND BLOWER VANES

Martin L. Abel, Detroit, Mich., assignor to Tann Corporation, Detroit, Mich., a corporation of Michigan Application May 5, 1954, Serial No. 427,703

9 Claims. (Cl. 308—121)

This invention relates to bearing mounts, and particularly to a bearing mount for a driven shaft which has reservoirs for retaining a lubricant.

For the purpose of illustration, the bearing is provided in a hub of a supporting plate for mounting a shaft for a blower driven from a pulley mounted upon the opposite end of the shaft. The hub of the supporting plate is splined to provide reservoirs for the lubricant, the inner faces of the lands of the splines supporting sleeve bearings of the porous type which are mounted in each end of the hub and which provide the journal for the shaft which operates within the sleeve. The central space between the sleeve and sleeve bearings forms an extension of the reservoirs, being in communication therewith, and an opening through the hub into the space between the sleeve and sleeve bearings permits the application of the lubricant in the space and reservoirs. The lubricant may be any suitable liquid oil, preferably retained in a wicking material which is preferably composed of cellulose fibers pulverized to a fine granular form which is very absorbent to oil and other lubricants and which permits the application thereof by force from a suitable pressure gun. Caps are provided on each end of the hub which collect any oil thrown from the shaft at the end of the sleeve bearings so that it may be delivered back into the wicking material and reservoirs to provide a recirculatory lubrication system.

Accordingly, the main objects of the invention are: to provide a hub with recesses forming reservoirs adjacent to sleeve bearings supported therein so as to have the lubricant available to lubricate the shaft operating within the bearings; to provide a plurality of grooves lengthwise on the inner surface of the hub so that reservoirs will be formed back of sleeve bearings supported on the faces of the lands formed thereby; to have the sleeve bearings spaced at the center of the hub to provide a central space in communication with the recesses or reservoirs formed by the slots so that a lubricant may be applied to the central space and forced into the areas forming the recesses; to provide a lubricant in recesses disposed between and outwardly of porous sleeve bearings which is retained by a powdered wicking material within the recesses and which is trapped by collars on the end of the hub so that it may be returned to the reservoirs and thus provide long life to the bearing, and, in general, to provide a bearing which is simple in construction and economical of manufacture.

Other objects and features of novelty of the invention will be specifically pointed out or will become apparent when referring, for a better understanding of the invention, to the following description taken in conjunction with the accompanying drawings, wherein:

Figure 1 is a sectional view of a supporting plate having a hub thereon providing reservoirs for a lubricant and supporting sleeve bearings for a shaft, embodying features of the present invention taken along line 1—1 of Fig. 3;

Fig. 2 is a sectional view of the structure illustrated in Fig. 1, taken on the line 2—2 thereof;

Fig. 3 is a broken end view of the structure illustrated in Fig. 1.

Fig. 4 is a sectional view of a bearing embodying features of the present invention;

Fig. 5 is a sectional view of the structure illustrated in Fig. 4, taken on the line 5—5 thereof;

Fig. 6 is a view of structure, similar to that illustrated in Fig. 4, showing a further form which the invention may assume;

Fig. 7 is a sectional view of the structure illustrated in Fig. 6, taken on the line 7—7 thereof;

Fig. 8 is a view of structure, similar to that illustrated in Fig. 6, showing a still further form of the invention, and Fig. 9 is a sectional view of the structure illustrated in Fig. 8, taken on the line 9—9 thereof.

Referring now to the drawings, in Fig. 1 is shown a blower supporting plate 6 having a plurality of stiffening members 8 and a central hub 10. The supporting plate 6 may be mounted on a suitable support frame by means of an inwardly offset surface 12 disposed along the outer edge of the plate which is provided with a plurality of bolt holes 14. The hub 10 of the supporting plate 6 is provided with an aperture 15 which is splined as at 16 to provide a plurality of reservoirs adapted to retain a suitable liquid oil lubricant. A pair of porous type sleeve bearings 20 and 22 is mounted in the ends of the aperture 15 and is supported therein by the inner spline faces or lands 18. The central space 24 between the inner ends of the sleeve bearings 20 and 22 and the lands 18 is connected to the splines or reservoirs 16 and provides a central area for retaining the lubricant and for distributing it to the various reservoirs. The central space 24 and the reservoirs 16 preferably contain a wicking material which preferably is composed of cellulose fibers which have been pulverized to a fine granular form which is very absorbent to liquid oil. The hub 10 is provided with a threaded aperture 26 into the central space 24 adapted to receive a suitable pressure gun for forcing or extruding the lubricant and wicking material into the central space 24 and reservoirs 16. A threaded plug 28 is provided to close the threaded aperture 26 when it is not being used.

A shaft 30 is journaled in the sleeve bearings 20 and 22 and is provided on the forward end 31 with blower vanes 32 which are preferably cast in place on the shaft. Fixedly mounted on the other end of the shaft 30 is a V-type pulley 34 adapted to be driven by any suitable belt drive means. The pulley 34 is secured to the shaft 30 by means of a setscrew 38 which is threadably mounted in an offset portion 40 of the pulley hub 36 and adapted to be tightened against a flattened or tang portion 42 of the shaft 30. As a safety measure, the pulley 34 may be additionally secured to the shaft 30 as by means of the snap ring 44 which is seated adjacent the outer surface 35 of the pulley hub 36 in a groove 46 provided in the end of shaft 30.

A pair of combination oil sling and thrust washers 48 and 50, preferably made from a suitable fibrous material, is provided between the outer ends of the sleeve bearings 20 and 22 and the hubs 51 and 36 of the blower 32 and pulley 34, respectively. The ends of the supporting plate hub 10 are enclosed by a pair of oil retaining ferrules or caps 52 and 54 which are provided with vellumoid gaskets 56 and 58, respectively.

In operation, the fiber washers 48 and 50 are adapted to throw any lubricant which works outwardly along the driven shaft 30 back into the enclosures 60 and 62 formed by the caps 52 and 54, respectively. The lubricant trapped in the enclosures 60 and 62 is then recirculated back into the bearing lubrication system by means of the very absorbent wicking material in the splines of reservoirs 16, the outer ends of which are in communication with enclosures 60 and 62, as illustrated at 64.

In Figs. 4 to 9 inclusive, further forms of bearings are illustrated suitable for application to a pillow block, such as illustrated and described in the copeding application of M. L. Abel, Serial No. 345,043, filed March 27, 1953, and assigned to the assignee of the present invention. The truncated spherical body 66 may be suported in the encompassing and supporting stampings, as disclosed in said application. In the present arrangement, a sleeve 68 has a central annular projection 70 which extends between a pair of porous sleeve bearings 72 which are press-fitted to the inner surface 74 of the body 66. The inner surface 74 is interrupted by laterally extending slots 76 in which a lubricant is maintained in wicking or like carrying material. An annular slot 78 extends inwardly of the surface 74 midway between the ends of the body 66 in communication with the slots 76 for providing a pasageway for the lubricant between the slots. The sleeve bearings 72 are retained adjacent to the central annular projection 70 of the sleeve 68 by peening or coining of the metal of the sleeve 68 and body 66 adjacent to the outer ends of the sleeve, as illustrated at 80 and 82, respectively. After the metal working operation, the material charged with the lubricant is filled within the slots 76 and flanged end caps 84 are pressed within shoulders 86 provided at the ends of the body 66. Any of the lubricant which attempts to travel along the surface of the sleeve 68 outwardly of the annular projection 70 will be interrupted by the projecting metal lips 80 which will throw the drops of the collected fluid radially against the enclosing caps 84 and will be absorbed by the carrying material in the slots 76 and that which may collect within the caps 84.

In Figs. 6 and 7, a similar form of bearing is illustrated, that wherein a split ring 88 snaps within a slot 90 in a sleeve 92 against which the porous bearing sleeves 72 abut. The sleeves are retained in abutted position by split spring rings 94 which snap into slots 96 provided near the ends of the sleeve 92. Fingers 98 are spaced about the outer periphery of the rings 94 in position to engage the ends of the body 66 to prevent the body from shifting relative to the sleeve. The caps 84 are applied to the ends of the body 66 for catching the lubricant which may be thrown from the rings 94 as it travels outwardly along the surface of the sleeve 92. The lubricant-charged material is placed within the slots 76 in the body 66 in a manner as pointed out hereinabove and an annular slot 78 provides communication between the slots.

In Figs. 8 and 9, a further form of the invention is illustrated, that wherein a sleeve 100 is mounted within a porous sleeve bearing 102 which is in engagement with the inner surface 74 of the body 66 that has slots 74 provided therein. The slots are maintained in communication with each other by the annular slot 78 in a manner as pointed out hereinabove. Split spring rings 94 having spaced fingers 98 thereon are secured in slots 96 near the ends of the sleeve 100. The rings 94 prevent the shifting of the body 66 and sleeve 102 relative to the sleeve 100. End caps 84 are secured in the shouldered recesses 86 in the ends of the body 66 in the manner as pointed out hereinabove, while the lubricant-charged material is packed within the slots 74 for lubricating the bearing 102.

In all of the arrangements herein described, the lubricant-charged material is retained within the slots 74 and in some instances within the caps 84. The caps and the central slots 78 provide passageways for the fluid communicating with the slots 76. The lubricant in the carrying material may move through the pores of the sleeve bearings and outwardly along the surface of the engaged sleeve as relative rotation occurs therebetween to be returned to the carrying material in the slots 74 from the interior of the end caps 84. When recirculating the lubricant in this manner, the bearing has an extremely long life and substantially no wear occurs between relative rotating surfaces even under extreme load conditions. Very little, if any, heating occurs to the metal of the relatively rotating sleeves as proper lubrication is maintained therebetween at all times.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. A bearing comprising a body having an aperture therethrough, the wall of said aperture having a plurality of longitudinal slots disposed therein providing lands therebetween, a porous sleeve bearing supported by said lands and enclosing said slots, a lubricant in said slots engaging said bearing, a rotatable sleeve within said porous sleeve, lubricant slinging means at each end of the rotatable sleeve, and caps enclosing the ends of the body and slinging means for collecting the lubricant from said means and returning it to the slots.

2. A bearing comprising a body having an aperture therethrough, the wall of said aperture having recess means forming a reservoir for a lubricant, porous sleeve bearing means supported by said body and enclosing said reservoir, a lubricant in said reservoir engaging said bearing means, a rotatable sleeve within said porous sleeve, oil slinging means at each end of the rotatable sleeve, and cap means enclosing the ends of the body and slinging means for collecting the lubricant from said slinging means and returning it to the reservoir.

3. A bearing comprising a body having an aperture therethrough, the wall of said aperture having a plurality of longitudinal slots disposed therein providing lands therebetween, porous sleeve bearing means supported by said lands and enclosing said slots which communicate with each other through an annular slot in said aperture, a powdered cellulose material saturated with oil disposed in said slots in engagement with said bearing means, a rotatable sleeve within said porous sleeve, lubricant slinging means at each end of the rotatable sleeve, and caps at each end of the body for collecting the lubricant from said slinging means and returning it to said material.

4. A bearing comprising a body having an aperture therethrough, the wall of said aperture having a plurality of longitudinal slots disposed therein providing lands therebetween, porous sleeve bearing means supported by said lands and enclosing said slots which communicate with each other through an annular slot in said aperture, a powdered cellulose material saturated with oil disposed in said slots in engagement with said bearing means, a rotatable sleeve within said porous sleeve, caps at the ends of the body extending over the rotatable sleeve for enclosing the ends of the slots and retaining the oil therewithin, and means interrupting the flow of lubricant outwardly of the bearing means and directing it into the ends of the caps.

5. A bearing comprising a body having an aperture therethrough, said aperture having a plurality of longitudinal slots disposed therein providing lands therebetween which are interrupted by an annular slot, a sleeve for receiving a shaft having an outer annular projection, and a pair of porous sleeve bearings rotatably mounted on the ends of said sleeve in abutting relation to said annular projection and supported on the ends of the lands against rotation, the metal of the sleeve and that of the body being flanged over the ends of said bearings to maintain the bearings, the body and sleeve in aligned relation to each other.

6. A bearing comprising a body having an aperture therethrough, said aperture having a plurality of longitudinal slots disposed therein providing lands therebetween which are interrupted by an annular slot, a sleeve for receiving a shaft having an outer annular projection, a pair of porous sleeve bearings rotatably mounted on the ends of said sleeve in abutting relation to said annular projection and supported on the ends of the lands against rotation, the metal of the sleeve and that of the body being flanged over the ends of said bearings to maintain the bearings, the body and sleeve in aligned relation to each other, an oil-saturated material disposed within said slots in engagement with said bearings, and end caps secured to said body and extending over the ends of said slots.

7. A bearing comprising a body having an aperture therethrough, said aperture having a plurality of longitudinal slots disposed therein providing lands therebetween which are interrupted by an annular slot, a sleeve for receiving a shaft having an outer annular projection, a pair of porous sleeve bearings rotatably mounted on the ends of said sleeve in abutting relation to said annular projection and supported on the ends of the lands against rotation, a split ring extending into an annular slot at each end of the sleeve, and end caps secured to said body and extending over the ends of said slots.

8. A bearing comprising a body having a central aperture containing a plurality of longitudinal slots providing projecting lands which are interrupted by an annular slot through which the slots communicate with each other, porous sleeve bearing means mounted within the aperture of said body on said lands, a rotatable sleeve engaging said bearing means, means for retaining said sleeve, bearing means and body in aligned relation to each other, a lubricant-saturated material disposed in said slots in engagement with said bearing means, and end caps carried by said body for enclosing the ends of said slots.

9. A bearing as recited in claim 8 wherein the aligning means are snap rings extending within slots in the sleeve and having extending portions engaging the ends of the bearing means.

References Cited in the file of this patent
UNITED STATES PATENTS

| Number | Name | Date |
|---|---|---|
| 764,890 | Hendrickson | July 12, 1904 |
| 1,096,298 | Garber | May 12, 1914 |
| 1,230,579 | Hodge | June 19, 1917 |
| 1,330,829 | Wilson | Feb. 17, 1920 |
| 1,485,984 | Jones | Mar. 4, 1924 |
| 2,035,519 | Apple | Mar. 31, 1936 |
| 2,138,659 | Kindig | Nov. 29, 1938 |
| 2,263,178 | Lignian et al. | Nov. 18, 1941 |
| 2,516,021 | Samzelius | July 18, 1950 |
| 2,671,407 | Higbie | Mar. 9, 1954 |
| 2,685,658 | Feiertag | Aug. 3, 1954 |
| 2,692,559 | Rogers | Oct. 26, 1954 |
| 2,704,232 | Johnson | Mar. 15, 1955 |

FOREIGN PATENTS

| Number | Country | Date |
|---|---|---|
| 224,173 | Great Britain | Nov. 6, 1924 |